Patented Jan. 12, 1932

1,841,001

UNITED STATES PATENT OFFICE

GEORGE WILLIAM BELL, OF DETROIT, MICHIGAN

ANTIVIBRATION DEVICE FOR AUTOMOBILES AND LIKE VEHICLES

Original application filed March 24, 1925, Serial No. 18,066. Divided and this application filed May 13, 1929. Serial No. 362,808.

This application is a divisional part of my application Serial No. 18,066, filed March 24, 1925, allowed November 20, 1928, now Patent No. 1,717,000, issued June 11, 1929.

This invention relates to pneumatic antivibration devices of the piston and cylinder type disposed between the rear wheels and axles of automobiles and like vehicles, and has for its object improvements in the method and means of mounting, demounting, and journaling the wheel on the said device, to facilitate its removal therefrom to permit quick access to the brake and parts and to the device; to improve the efficiency of the braking means by increasing the braking torque and the amount of braking surface engaged; to reduce the unsprung load relative to the weight of the vehicle and axle; and to facilitate the mounting and demounting of single or double rim and tire and at the same time to utilize the circumferential strength of the said rim or rims when secured in position to augment the strength of the brake drum against radial distortion under the pressure of applied brake shoes.

I will further describe my invention with the aid of the accompanying drawings in which:—

Figure 1:
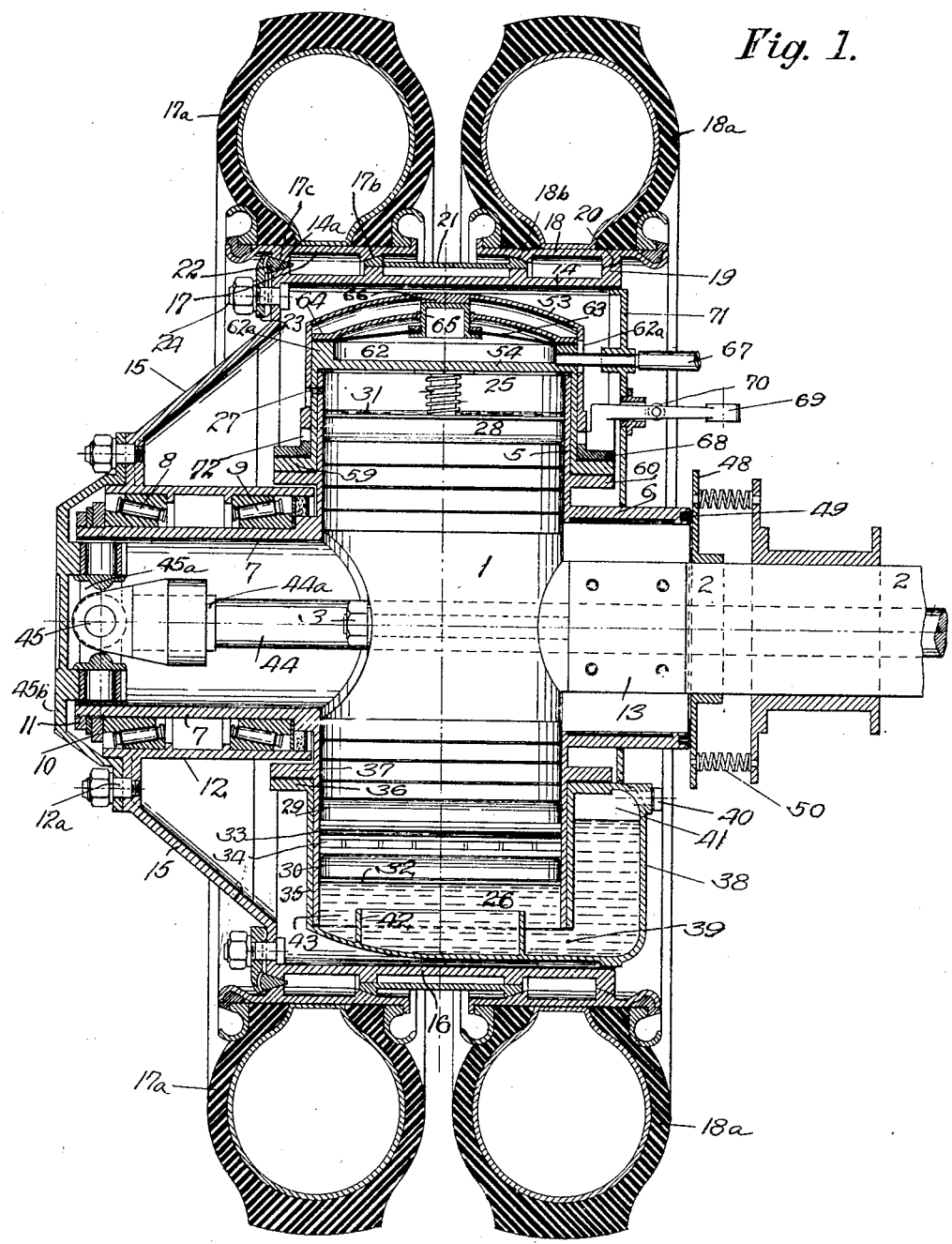
Fig. 1 is a vertical cross section of a pneumatic device disposed in the hub and plane of a rear shaft driven wheel of a heavy type automobile, showing the relative arrangement of the parts.
Figure 2:
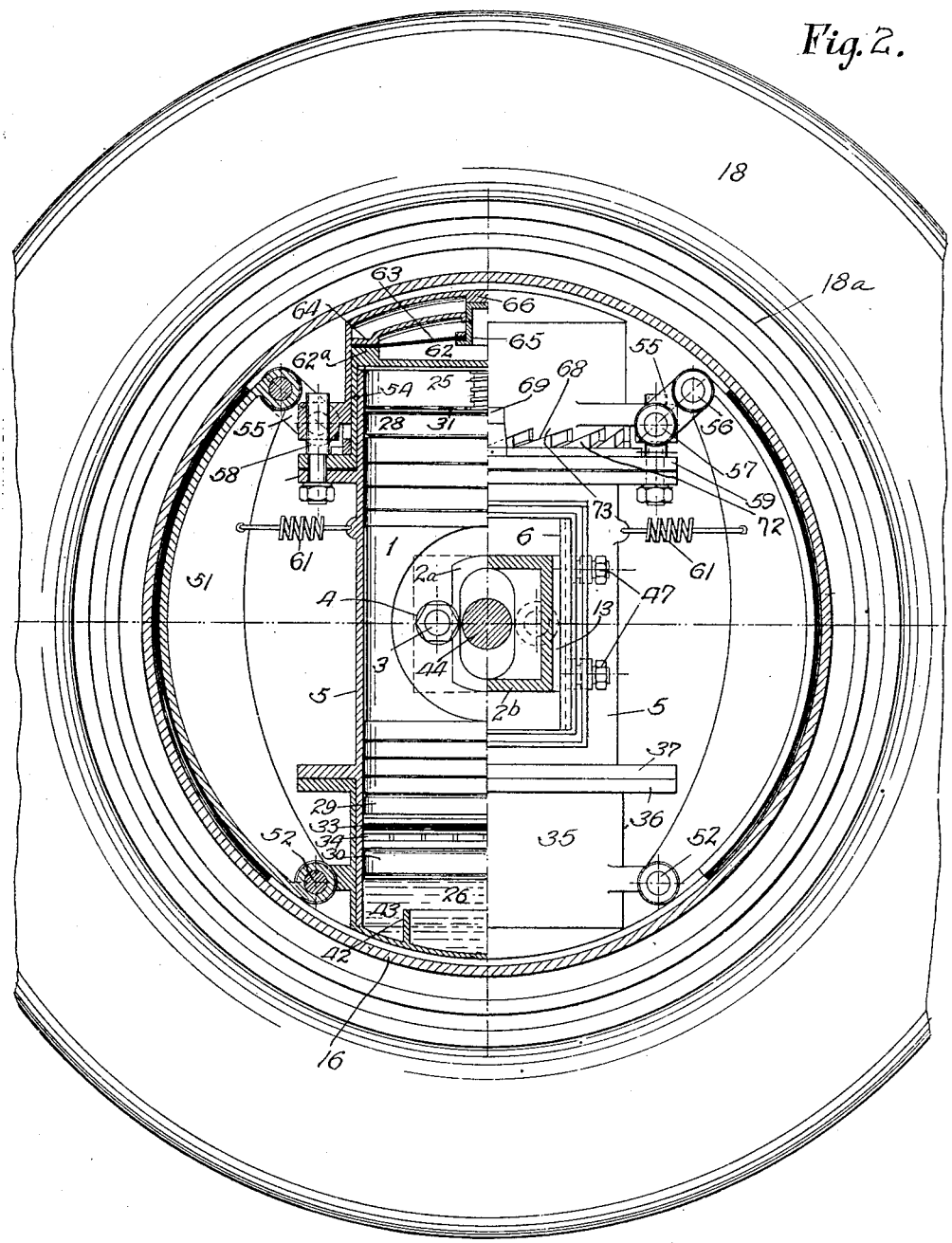
Fig. 2 is a view partly in longitudinal section and partly in elevation, in the vertical plane of Fig. 1.

Referring now to Figs. 1 and 2, of the drawings, which show the suspension device applied to a rear wheel of a heavy type automobile having an axle housing of conventional form. Piston 1 of the device has a transverse boss therethrough in which an outer flattened end portion 2a of the axle housing 2 is secured by studs 3 passing through the wall of the boss 4 into the shoulder formed by the main body of the housing 2. Piston 1 is adapted to permit the vertical oscillation of the cylinder 5 thereon the latter having a hollow guide arm 6 around the squared end portion 2b of the housing 2 and an outside arm 7 on which the bearings 8 and 9 are mounted and secured by the threaded ring 10 and the lock ring 11, and on which the hub 12 of the wheel revolves.

The inner arm 6 has sliding engagement with the vertical faces of the housing 2b, to which is attached detachable rubbing faces 13.

The cylinder 5 cooperates with the piston 1, and has a predetermined vertical displacement, and is constrained in its horizontal plane by the sliding engagement of the inner arm 6 and the housing 2b which it envelopes.

Access is afforded through the opening in the outside arm 7 to secure the piston 1 endwise to the housing 2 by means of the studs 3.

The wheel comprises a drum or felloe portion 14 open at its inner face and closed by a vertical disc portion 15 attached to the bearing hub 12, adapted to pass over the suspension device when being mounted endwise on the bearing arm 7. The central portion of the inner face of the wheel forms the brake drum 16.

On the outer periphery of the wheel drum 14 twin rims 17 and 18, and tires 17a and 18a of the conventional type are shown, and are carried by the rib 19, which is bevelled at its outer edge and adapted to engage with the bevelled rib 20 of the inner rim 18. To secure this rim in position a horizontally split spacing ring 21 is provided having outwardly bevelled edges and is adapted to slide over the wheel drum 14 and engage with the rib 18a of the inner rim 18 and 17b of the outer rim 17. Wedges or a wedge ring 22 of the usual type is arranged to engage with the rib 17c of the outer rim 17 and the bevelled edge 14a of the wheel drum 14. The lugs 23 and bolts 24 provide means for forcing the rims horizontally on their seats and secure the same thereon.

The spacing ring 21 may have openings therein to lighten the weight and permit circulation of air around the drum.

The usual driving members are provided between the respective tire rims and the wheel drum and engage therewith to transmit the driving torque thereto.

Sufficient space is provided between the respective rims and the wheel drum 14 to accommodate the tire valves.

It is obvious that other forms of tires and rims may be used and connected to the wheel without departing from the scope of this invention.

Referring now to the suspension device air chambers 25 and 26 are formed in the cylinder 5, one above and one below the axle housing 2a. Piston 1 engages in these chambers and cooperates therewith to form two air cushions the one below the axle which is formed by the space inside the piston 1 and the lower part of the cylinder 5 forming the air cushion or air spring which yieldingly supports the weight upon the wheel and the other operating as a dash-pot or check spring to check the vertical play of the cylinder 5 and the wheel supported thereon. The dashpot 25 communicates with the atmosphere under the control of the piston 1 through vent holes or ports 27 in the wall of the cylinder 5 and the parts engaged therewith.

The upper and lower ends of the piston 1 are provided with suitable cup packing rings 28, 29, and 30 secured and held in position by the threaded rings 31, and 32 on the piston. Between the lower packing rings 29 and 30 a felt wiper ring 33 and a groove 34 is provided to gather and trap any oil that may pass the lower packing ring 30.

The interior construction of piston 1, the means of supplying air to and from the device, and the air control means are not shown in the accompanying drawings, but are substantially indentical in arrangement and operation to those shown and described in the specification and drawings of the original application, Serial No. 18,066, filed March 24, 1925, and allowed November 20, 1928, of which this is a divisional part, and are therefore not referred to here.

The cap 35 closes the lower end of the cylinder 5 and is secured thereto by flanges 36 and 37 respectively attached thereto.

The air chamber 26 of the device is connected to the chamber 38 formed on the side of the cap 35 by the passage 39 and is disposed on the inner face of the cylinder 5 of the device, and is therefore accessible at all times from the inside of the wheel; it is provided with an opening 40 to permit of replenishment of oil to the air chamber 26 of the device, the level of the opening being arranged so that the correct level and quantity of oil required in the chamber for sealing and lubricating the piston 1 and packing ring 30 is insured when the oil overflows at the filling opening. A plug closes the opening and seals a space 41 containing air.

A ferrule 42 is formed in the lower cap 35 and is adapted to telescope with the opening in the lower face of the piston 1, (not shown in the drawings) cutting off the communication between the annular space 43 formed between the cylinder wall 5 and the ferrule 42, from the air chamber 26. The space 41 with the chamber 38 forms an oil and air dashpot arranged so that when the piston 1 in the cylinder 5 of the device approaches the end of its displacement and engages with the ferrule 42, the oil in the annular space 43 will be forced to pass between the ferrule 43 and opening in the piston and also with the chamber 38 through the passage 39 compressing the air contained therein above the oil in the space 41 thereby cushioning the piston and preventing it striking the cylinder.

To drive the rear wheels, the hollow axle housing 2 carries any type of differential mechanism disposed conveniently therein, with the universal joint connecting a main driving shaft or differential shaft section with the "take off" members of the differential, so as to permit oscillation of the shaft section in the housing. At the outer end portion of the shaft 44 a universal joint 45 connects it to the main driving hub 12, of the wheel 15.

Preferably the connection between the shaft 44 and the universal joint is by means of a flattened or keyed portion 44a of the shaft entering a correspondingly formed recess of a part of the joint so as to permit endwise movement thereof. The outer portion of the universal joint is connected by a ring 45a to a wheel cap 45b which is secured to the hub 12 of the wheel by bolts 12a.

The cap 45b with the universal joint 45 are detachable from the shaft 44 and the wheel hub 12 endwise when the bolts 12a are removed. Access is then afforded through the bearing arm 7 to the stud bolts 3 holding the piston 1 on the housing 2a.

The threaded lock ring 11 and washer 10 secures the bearings 8 and 9 and the wheel on the hollow arm 7 of the cylinder 5 endwise.

The wheel and brake drum may therefore be taken off the bearing arm by removing the said lock ring and washer leaving the device and brake parts mounted on the axle housing for inspection and adjustment.

To provide means for taking up the wear between the bearing face 13 of the housing and the inside vertical faces of the arm 6, vertical detachable guide bearings 46 adapted to engage with a hardened detachable bearing 13 secured to the vertical face of the housing 2b; the bearings 46 are shimmed up to a working fit and are held in position by stud bolts 47.

The opening in the arm 6 of the cylinder 5 is kept dust-free by the plate 48 arranged to engage and slide on the housing 2 horizontally and vertically on the felt washer 49 embedded in the groove in the inner edge of the arm 6. Springs 50 hold the plate 48 in dust-proof engagement with the said washer 49.

Brake shoes 51 are provided adapted to engage with the brake drum 14 at 16 and be disposed in the centre plane of the cylinder 5 of the device, and are pivotally secured to the cap 35 on the lower part of the cylinder 5 by the bolts 52 and at the upper end to a vertical reciprocable flanged cap 53 disposed on and guided by the upper part of the cylinder cap 54, by means of connecting links 55, bolts 56 and 57, and guide pins 58. The latter are secured vertically to the cap and cylinder flanges 59 and 60 respectively, and are in sliding engagement with the reciprocating cap 53 through holes in the bosses attached thereto. Springs 61 are secured respectively to the brake shoes 51 and lugs of the cylinder 5 to normally maintain the brake shoes free from the drum.

To operate the brake the fluid chamber 62 is formed in the upper part of the cap 54 of the cylinder 5, having an outer rim or flange 62a adapted to receive the outer edge of the diaphragm 63 to which it is secured and made air tight by the flanged cover 64. The centre of the diaphragm is secured to the guide member 65 which transmits the vertical movement of the diaphragm to the cap 53 through contact with the central boss 66.

An opening is provided in the chamber 62 through the slot 62a in the cap 53, and is connected by suitable flexible air hose conduit 67 to the control means disposed on the vehicle.

Cap 53 is provided with mechanical means for operating the said brake parts independently of the air actuating means comprising, a cam ring 68 adapted to surround, engage, and rest on the cylinder cap flange 59 and turn horizontally thereon by the lever 69. The emergency brake parts on the vehicle are attached to this lever. A spring 70 attached to the dust plate 71, which closes the inner face of the wheel and is carried by the cylinder 5, and to the brake lever 69, is disposed and arranged to normally hold the cam ring 68 at its "off" position.

A horizontal slot in the dust plate 71 permits the lever 69 to move the required degrees for operating the brakes. The cam ring 68 has on its inner edge vertically disposed teeth 72 adapted to act as a cam to engage with similar teeth 73 formed in the lower edge of the cap 53 and arranged so that when the lever 69 is moved horizontally forward the cap 53 will be raised free of the diaphragm member 65 and will apply the brake. The guide pins 58 are provided to prevent any tendency of the cap 53 to rotate thereon.

The spring 70 is provided to normally hold the cam ring 68 and lever 69 at the "off" position, unless the emergency brake is on, as when the vehicle is standing, so allowing the air brake to function as a service brake.

Referring to the fluid pressure brake parts, it is obvious that a piston and cylinder with suitable packing may be substituted as a mechanical equivalent in lieu of the chamber and flexible diaphragm herein shown in connection with the figures of the drawings and described, without departing from the ambit and scope of the invention.

What I claim is:—

1. In an anti-vibration device of the type set forth, an axle, an upright piston secured to the outer end thereof, an air cylinder in which the piston oscillates, means for guiding and constraining the cylinder in the horizontal plane thereon, including means for maintaining the opening in the guide means dust-free, in combination with an outwardly extending arm attached to the cylinder, a wheel, disposed in or adjacent to the plane of the cylinder, carried by and journaled on the arm, removable endwise therefrom to permit access to the mounted device.

2. In an anti-vibration device of the type set forth, an axle, an upright piston secured to the outer end thereof, an air cylinder in reciprocable engagement with the piston, means attached to the cylinder adapted to engage with the axle to guide it in its horizontal plane, including means for maintaining the opening in the guide means dust-free, in combination with an outwardly extending arm attached to the cylinder, bearings carried by the arm, a demountable hollow wheel, the hub of which is journaled on the bearings, adapted to surround the device and support at its outer periphery detachable single or double rim and tire, and means for detachably securing the wheel on the said arm endwise.

3. In an anti-vibration device of the type set forth, an axle housing, a piston detachably secured to the outer end portion thereof, through which the housing extends laterally, a cylinder reciprocable on the piston, means attached to the cylinder adapted to be in sliding engagement with the housing to guide and constrain it in the horizontal plane thereon, including means for maintaining the opening in the guide means dust-free, in combination with, an outwardly extending arm attached to the cylinder, having an opening therethrough in which the drive shaft extends, bearings carried by the arm, a wheel, the hub of which is journaled on the bearings, an oscillatory driving shaft journaled and contained in the housing having universal joint connection with the wheel hub, and means for securing the wheel hub detachably on the bearings, the wheel forming a unit detachable endwise from the mounted device.

4. In an anti-vibration device of the type set forth, an axle housing, a piston detachably secured to the outer end portion thereof, through which the housing extends laterally, a cylinder reciprocable on the piston, an inwardly extending arm surrounding and in sliding engagement with the housing, including adjustable sliding engagement means attached to the arm to guide and constrain the cylinder in the horizontal plane thereon, and means for maintaining the opening in the guide means dust-free, in combination with, a detachable outwardly extending arm having an opening therethrough in which the drive shaft rotates and oscillates, attached to the cylinder, bearings carried by the arm, a wheel, the hub of which is journaled on the bearings, adapted to surround the device, and support on its outer periphery a single or double rim and tire, in or adjacent to the plane of the cylinder, an oscillatory and rotatable guide shaft journaled in the housing and connected by a universal joint with the wheel to rotate it, and means detachably securing the wheel in position on the bearings, the wheel being a unit removable endwise from the mounted device.

5. In an anti-vibration device of the type set forth, an axle housing, a piston secured to the outer end portion thereof, through which the housing extends laterally, a cylinder reciprocable on the piston, means attached to the cylinder to guide and constrain it in sliding engagement with the axle housing in the horizontal plane thereon, including means for maintaining the opening in the guide means dust-free, in combination with, an outwardly extending arm attached to the cylinder having an opening therethrough in which the drive shaft oscillates and rotates, a wheel, carried by and journaled on the arm, and drive means in the housing having universal joint connection with the wheel to rotate it, including an opening in the lower face of the piston, a ferrule attached to the lower end of the cylinder adapted to telescope with the opening in the piston, a dashpot chamber disposed adjacent to and in communication with the annular space between the ferrule and the cylinder, and means accessible from the inside of the wheel for replenishing the liquid to the cylinder, and adapted when sealed to form an air and liquid dashpot to check the movement of the piston in the cylinder thereof.

6. In an anti-vibration device of the type set forth, an axle, an upright non-rotatable piston secured to the outer end thereof, an air cylinder in which the piston plays, an opening in the said cylinder adapted to accommodate the movement of the axle therein, in combination with an outwardly extending arm attached to the cylinder, a wheel, the hub of which is carried by and journaled on the arm, means for guiding and constraining the movement of the cylinder on the piston in the horizontal plane, and means associated with the wheel and the drive means to rotate the said wheel.

7. In an anti-vibration device of the type set forth, a hollow axle, and upright non-rotatable piston secured to the outer end thereof, an air cylinder in which the piston plays, an opening in the said cylinder adapted to accommodate the movement of the axle therein, in combination with an arm attached to the cylinder having an opening therethrough, a wheel, carried by and journaled on the arm, means for constraining the movement of the cylinder on the piston in the horizontal plane, and driving means disposed within the said hollow axle, extending through the said hollow arm adapted to connect the wheel hub to the drive means to rotate the said wheel.

8. In an anti-vibration device of the type set forth, an axle, an upright piston detachably secured to the outer end thereof, an air cylinder in which the piston plays, means for guiding the cylinder on the piston in the horizontal plane, in combination with an arm attached to the cylinder having an opening therethrough adapted to permit access to the piston securing means, a wheel, the hub of which is journaled on and carried by the arm, adapted to surround the device and support at its outer periphery single or double rim and tire, and means associated with the wheel and the drive means to rotate the said wheel.

9. In an anti-vibration device of the type set forth, an axle, an air cylinder in which the piston plays, means for guiding the cylinder on the piston in the horizontal plane, an arm attached to the cylinder, a wheel, carried by and journaled on the arm, in combination with an opening in the lower face of the piston, a ferrule attached to the lower end of the cylinder adapted to telescope with the opening in the piston, a chamber disposed adjacent to and adapted to be in restricted communication with the annular space between the ferrule and the cylinder to form an air and liquid dash-pot to check the movement of the piston in the cylinder thereof.

In testimony thereof, I affix my signature.

GEORGE WILLIAM BELL.